United States Patent [19]

Yow, Sr. et al.

[11] Patent Number: 5,174,797
[45] Date of Patent: Dec. 29, 1992

[54] FIBER COLLECTOR

[75] Inventors: Randall L. Yow, Sr., Greensboro; Gary Jansen, Asheboro, both of N.C.

[73] Assignee: Industrial Air, Inc., Greensboro, N.C.

[21] Appl. No.: 758,798

[22] Filed: Sep. 12, 1991

[51] Int. Cl.⁵ .............................................. B01D 46/04
[52] U.S. Cl. ........................................ 55/96; 55/273; 55/283; 55/303; 55/314; 55/484
[58] Field of Search ..................... 55/96, 73, 302, 283, 55/303, 312-314, 484

[56] References Cited

U.S. PATENT DOCUMENTS

| | | | |
|---|---|---|---|
| 1,493,110 | 5/1924 | Diehl | 55/314 |
| 1,729,527 | 9/1929 | Titgen | 55/430 |
| 1,945,820 | 2/1939 | Mitchell | 55/314 |
| 2,836,256 | 5/1958 | Caskey | 55/303 |
| 3,146,080 | 8/1964 | Ruble et al. | 55/96 |
| 3,612,616 | 10/1971 | Stewart et al. | 55/302 |
| 4,637,096 | 1/1987 | Wise et al. | 19/200 |
| 4,778,491 | 10/1988 | Yow, Sr. | 55/96 |

*Primary Examiner*—Bernard Nozick
*Attorney, Agent, or Firm*—Rhodes, Coats & Bennett

[57] ABSTRACT

A fiber collector collects fiber from a moving airflow having entrained fibers. A primary plenum has a fiber collection zone in its lower portion. Adjacent screens downstream of the primary plenum are slanted with respect to the primary plenum so that fiber held by the screens will be gravitationally attracted to the fiber collection zone. Secondary plenums downstream of the screens have independently openable air inlets and independently closable passages. A fan downstream of the passages pulls air through the primary plenum, screens, secondary plenums and passages. Pressure sensors upstream of the screens and downstream of the passages provide pressure sense data to a control means which closes the passages for one of the secondary plenums and opens the independently openable air inlet of the same secondary plenum when the pressure difference between the first and second pressure sensors exceeds a desired range. This reverses the airflow through the full screen as a backwash to cause the fibers held by the screen to be dropped into the fiber collection zone. The control means closes the independently openable air inlet and opens the passages after a preset period of time and continues to backwash secondary plenums in a preset sequence as long as the pressure difference exceeds the preset range.

31 Claims, 6 Drawing Sheets

FIBER COLLECTOR

BACKGROUND OF THE INVENTION

The present invention relates to improvements in fiber collectors, particularly for use in removing fiber and other impurities from airstream.

U.S. Pat. No. 4,778,491 to Yow, Sr. discloses a filter apparatus which is suitable for use in industrial applications such as cotton mills in which cotton dust and fibers are to be removed from airflows to reduce contamination of working atmospheres. Generally air is cleaned by blowing it through a filter medium, such as a screen or a fabric filter, which stops the solid material while allowing air to pass through, so that the passed-through air is free of the materials stopped by the filter and is therefore considerably cleaner. After a period of time, however, the filter accumulates so much of the solid material that is becomes clogged and air can no longer pass through the filter.

The apparatus of the prior patent addressed this problem by providing alternately shifting vanes downstream of the filter, so that one portion of the filter could be an active filter surface while the other is backwashed by reverse flow of air. The vanes are shifted from side to side periodically to change portions of the filter from a backwash to an active status. This apparatus has been a satisfactory solution of the air cleaning problem in smaller applications, however, it has not been found practical to scale this apparatus up to larger sizes. That is, the prior art apparatus has been suitable for handling volumes of air up to about 11,000 cu. ft./min. However, when the mill requires a larger air handling capability, such as on the order of 60,000 cu. ft./min., the apparatus simply cannot be economically made to handle the larger volumes.

Also, by directing airflows in the vanes of the prior art apparatus, somewhat higher filter differentials are required, on the order of 4 inches water level. At this pressure, seals are required between joints to prevent undue leakage and maintain the pressure, adding to the cost and complexity. Also, the higher air pressure is more expensive to generate in terms of energy being supplied to a fan or blower for the system.

Accordingly, there is a need in the art for an air cleaning apparatus and fiber collector in which larger air volumes can be handled, preferably at a lower pressure.

SUMMARY OF THE INVENTION

The present invention fulfills this need in the art by providing a fiber collector for collecting fiber from a moving airflow having entrained fibers. The collector includes a primary plenum into which the moving airflow with entrained fibers is introduced having a fiber collection zone in a lower portion thereof. A plurality of screens are located downstream of the primary plenum, and a secondary plenum is downstream of each of the screens, each having an independently openable air inlet, and independently closable passages downstream of the secondary plenums. A first pressure sensor upstream of the screens, a second pressure sensor downstream of the independently closable passages provide pressure sense data to a control means. The control means simultaneously closes the independently closeable passage of one of the secondary plenums and opens the independently openable air inlet of the same secondary plenum when the pressure difference between the first and second pressure sensors exceeds a desired range.

Thus, an airflow with entrained fibers may be continually introduced into the primary plenum, with the airflow passing through the screens and fiber falling into the collection zone or being held by the screens. In practice, it is desirable to have a substantial proportion of the fibers held to the screen to form a mat to act as a filter of finer material. When one of the screens is so full of held fibers as to inhibit air flow therethrough and thereby increase the pressure difference measured by the first and second sensors, the independently openable air inlet to the secondary plenum downstream of the full screen is opened and the independently closeable passage downstream of the full screen is closed so that the airflow through the full screen is reversed as a backwash to cause the fibers held by the screen to be dropped in to the fiber collection zone. The backwash air joins the main airflow through the other screens and secondary plenums.

In a preferred embodiment, the control means closes the independently openable air inlet and opens the independently closeable passage after a preset period of time. Then, the control means backawashes another secondary plenum if the pressure difference is still above the preset range. Preferably, it continues to backwash secondary plenums as long as the pressure difference exceeds the preset range. Desirably, the control means follows a preset sequence in backwashing secondary plenums.

In a preferred embodiment, the control means halts the backwash sequence if the pressure difference after backwashing a screen is below the preset range, but resumes the sequence where it left off when the pressure difference again exceeds the preset range. In one embodiment the control means is a programmable controller and dual set point differential switch.

Preferably, the passage is a set of passages of area about one half as large as the area of its secondary plenum in a plane perpendicular to the direction of airflow through the secondary plenum. Providing passages so sized does not substantially raise the pressure in the secondary plenums when they are open. Also, the screens are preferably slanted with respect to the primary plenum so that fiber held by the screen will be gravitationally attracted to the fiber collection zone. Typically, the screens are immediately adjacent one another. Unlike certain prior art designs, the number of the secondary plenums and associated screens, passages and air inlets is unlimited, and in one embodiment is greater than 4. Nonetheless, usually only one set of pressure sensors are needed to determine when to backwash.

Preferably, the air inlets receive air from ambient. Alternatively, they may receive air from downstream of the passages, so that the backwash airflow is derived from the main airflow through the fiber collector, without the need of additional fans or blowers. In such a case a fan downstream of the passages pulls air through the primary plenum, screens, secondary plenums and passages and has an outlet communicating with the air inlets to provide air to the secondary plenums when their respective air inlets are open. If the backwash air to the secondary plenums comes from ambient, the air inlets need only open to the ambient to set up the backwash flow through the screen, laterally in the primary plenum and then forwardly though the other screens, joining the main airflow.

The invention also provides a method of collecting fiber from a moving airflow having entrained fibers. The method includes directing the moving airflow with entrained fibers into a primary plenum having a fiber collection zone in its lower portion. A first portion of the air in the primary plenum is then directed through a first screen downstream of the primary plenum with the fibers entrained in the first portion of air collecting on the first screen, the first portion of air continuing through a first secondary plenum downstream of the first screen and a first independently closable passage downstream of the first secondary plenum. Similarly, a second portion of air is directed through a second screen downstream of the primary plenum with the fibers entrained in the second portion of air collecting on the second screen, the second portion of air continuing through a second secondary plenum downstream of the second screen and a second independently closable passage downstream of the second secondary plenum. Desirably, the first and second portions are joined downstream of the independently closeable passages.

The pressure upstream of the screens and downstream of the independently closable passages is sensed, and when the pressure difference between the locations exceeds a desired range, the first independently closeable passage is closed. Also, a flow of clean air is introduced to the first secondary plenum downstream of the first screen and upstream of the first passage to backwash the first screen. This drops fibers blocking the first screen into the collection zone, and the flow of clean air passes through the second screen, second secondary plenum and second independently closeable passage with the second portion of air. In a preferred embodiment the method includes ceasing the flow of clean air into the first secondary plenum and opening the first independently closeable passage after a preset period of time.

Preferably, the method includes sensing if the pressure difference is still above a desired range, and if so, closing the second independently closeable passage and introducing a flow of clean air to the second secondary plenum downstream of the second screen and upstream of the second passage to backwash the second screen. This drops fibers blocking the second screen into the collection zone with the flow of clean air passing through the first screen, first secondary plenum and first independently closeable passage with the first portion of air. The method may include continuing to backwash secondary plenums as long as the pressure difference exceeds a desired range and following a preset sequence in backwashing secondary plenums. According to one embodiment of the method, if the pressure difference after a backwash is sensed to be below a desired range, backwashing is halted. However, backwashing is resumed in the sequence where it was left off when the pressure difference again exceeds a desired range.

Preferably, the number of portions of air being directed through secondary plenums, associated screens and passages and the number of clean air flows is greater than 4. Typically, the upstream and downstream pressure sensing each take place at only one location. Preferably, the clean air flow is directed from the ambient. Alternatively, the air may be directed from downstream of the passages so that the backwash airflow is derived from the main airflow through the fiber collector.

BRIEF DESCRIPTION OF THE DRAWINGS

The invention will be better understood by a study of the detailed description of the preferred embodiment along with a review of the drawings in which.

DETAILED DESCRIPTION OF THE PREFERRED EMBODIMENT

Figure 1:
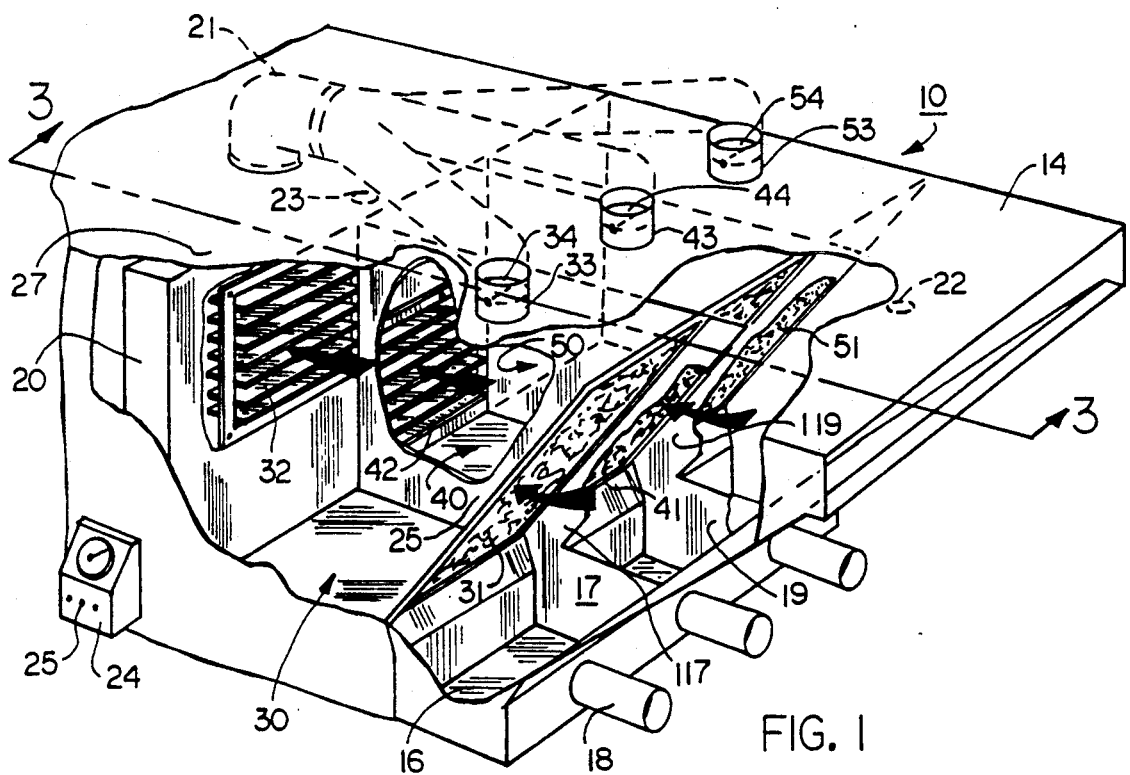
FIG. 1 is a perspective view of an apparatus according to the invention, with sections broken away and showing the airflow through the apparatus.
Figure 2:
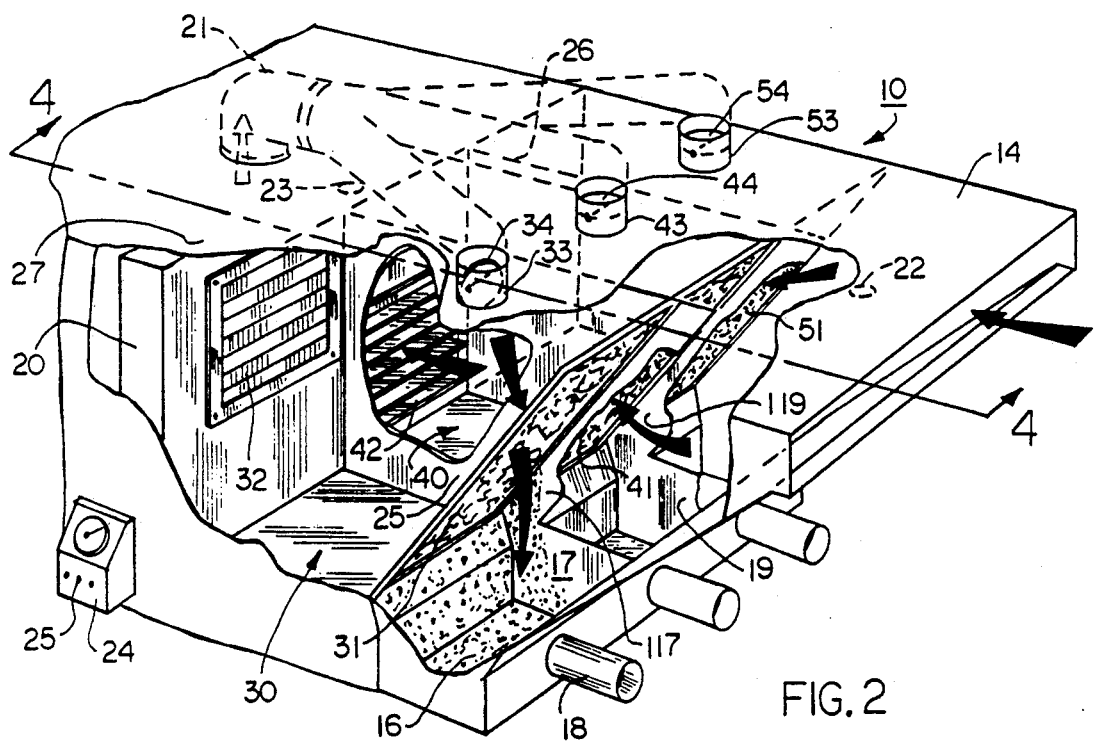
FIG. 2 is a view similar to the view of FIG. 1, but showing the apparatus in a backwashing mode.

FIGS. 1 and 2 of the drawings depict in a perspective view the apparatus according to one embodiment of the invention. The apparatus 10 includes a contaminated air inlet 12 which opens into a primary plenum 14. At the bottom of the primary plenum 14, a collection zone 16 is provided to which solid material removed from the airflow falls. Preferably, the collection zone 16 has dividers 117 and 119 extending forwardly from the common edges of screens 31, 41, and 51. Also, dividers 17 and 19 are provided coplanar with dividers 117 and 119 in the collection zone. The solids can be removed from the collection zone through solids retrieval apparatus 18, which can be screw conveyors, an intermittent vacuum system, or any other suitable device for removing solids. A series of secondary plenums 30,40,50 are disposed downstream of the primary plenum 14 and separated from the primary plenum by respective screens 31,41,51. Fixed divider walls 25,26 divide the secondary plenums laterally and the peripheral bounds of the secondary plenums are provided as continuation of the outer walls of the primary plenum 14. As can be appreciated, any number of secondary plenums can be provided, oriented in any desired array, including stacking sideways and vertically. One of the advantages of the present invention is that it allows the air handling capacity of the apparatus to be increased primarily by adding secondary plenums, screens and the parts associated therewith.

Downstream of each secondary plenum is a set of louvers mounted in passages 32,42, and a similar set of louvers for secondary plenum 50, not shown. These are normally open, as shown in FIG. 1. The set of louvers for each secondary plenum is controllable independently of the louvers of other secondary plenums. As seen in FIGS. 1 and 2, the sets of louvers are mounted at the top or bottom of the back wall of the secondary plenum, and extend about one half the height of the secondary plenum. Thus, each set of louvers has an area about one half the area of its associated secondary plenum in a plane perpendicular to the direction of airflow through the secondary plenum. So sizing the louvers helps establish a desired pressure drop across the screens. The louvers are openable and closable in any convenient fashion, such as common crank-arms, meshing gears or any other desired arrangement so that the passages for a given secondary plenum can be opened or closed, particularly desirably under remote control. Downstream of the passages, a tertiary plenum 27 is provided in which the airstream from the three secondary plenums are recombined into a single larger airstream. Downstream of the plenum 27 is a fan 20 which provides the motive force for the air to pass through the entire system. If desired, the fan can be placed elsewhere in the system, and especially downstream of further filter units. As an optional feature shown in phantom in the figures, downstream of the fan, a conduit 21 provides a pressurized air supply leading back to air inlets 33,43,53, respectively closed by valves 34,44,54 to the secondary plenums 30,40,50. Thus, when the valve 34 is opened, pressurized air from downstream of the fan can be fed back to the secondary plenum 30. Similarly, air can be fed back to the secondary plenums 40,50 through their respective inlets 43,53 when their respective valves 34,44 are open. The valves can be any desired configuration and are independently operable from one another.

More preferably, however, the inlets terminate just above the valves, so that the air to be admitted to the secondary plenums when the valves are open comes from the ambient. Alternatively, the inlets could be continued to any desired source of air.

A pressure sensor 22 is provided in the primary plenum 14 to provide an indication of the static pressure P1 therein. Similarly, a pressure sensor 23 is provided in the tertiary plenum 27 to provide an indication of the pressure P2 downstream of the passages. The pressure P1 sensed by sensor 22 and the pressure P2 sensed by sensor 23 are applied to dual set point differential switch 25 which communicates with a programmable controller 24 which, in turn, has connections to independently control the louvers 32,42,52 as well as the valves 34,44,54. The dual set point switch and programmable controller together act as a control means for the apparatus. Other control means designs can be implemented, as will be apparent to those of ordinary skill in the art.

The dual set point differential switch 25 evaluates the pressure readings P1,P2. When P1 exceeds P2 by more than a first preset amount, X1, the switch 25 communicates to the programmable controller which initiates a backwashing procedure of one of the screens. The selection screens is in accordance with a sequence so that only one screen is backwashed at a time, and the screens are backwashed in sequence so as to not allow an excessive accumulation on any one screen. For example, if the sequence calls for the first screen 31 to be backwashed, the programmable controller will close the louvers 32 and open the valve 34. A timer in the controller will maintain the louvers 32 closed and the valve 34 open for a preset period of time, say 5 seconds, and then close the valve 34 and open the louvers 32. The switch 25 then again evaluates the difference in the pressure P1,P2 and, if the pressure difference is still excessive, such as by being above a lower preset difference, X2, the programmable controller initiates the backwashing of another screen by closing the associated passage and opening the associated air inlet. This sequence continues until the difference between P1 and P2 no longer exceeds X2. X1 and X2 represent upper and lower values in a range, respectively. A range having upper and lower values is preferred rather than a single set point to permit the system to have a period of no backwashing to permit a mat of fibers to grow on the screens as the pressure difference grows from X2 to X1. The mat filters out fine fibers and particles that may pass a fully cleaned screen.

Then, as the solids accumulation again causes the pressure difference between P1 and P2 to exceed X1, the backwashing continues with the next screen in the sequence. Presumably, by repeating the same sequence over and over, each secondary plenum's screen will be backwashed regularly. The sequence may be chosen arbitrarily. The programmable controller will follow the chosen sequence when communication is received from switch 25 that backwashing is needed.

Figure 3:
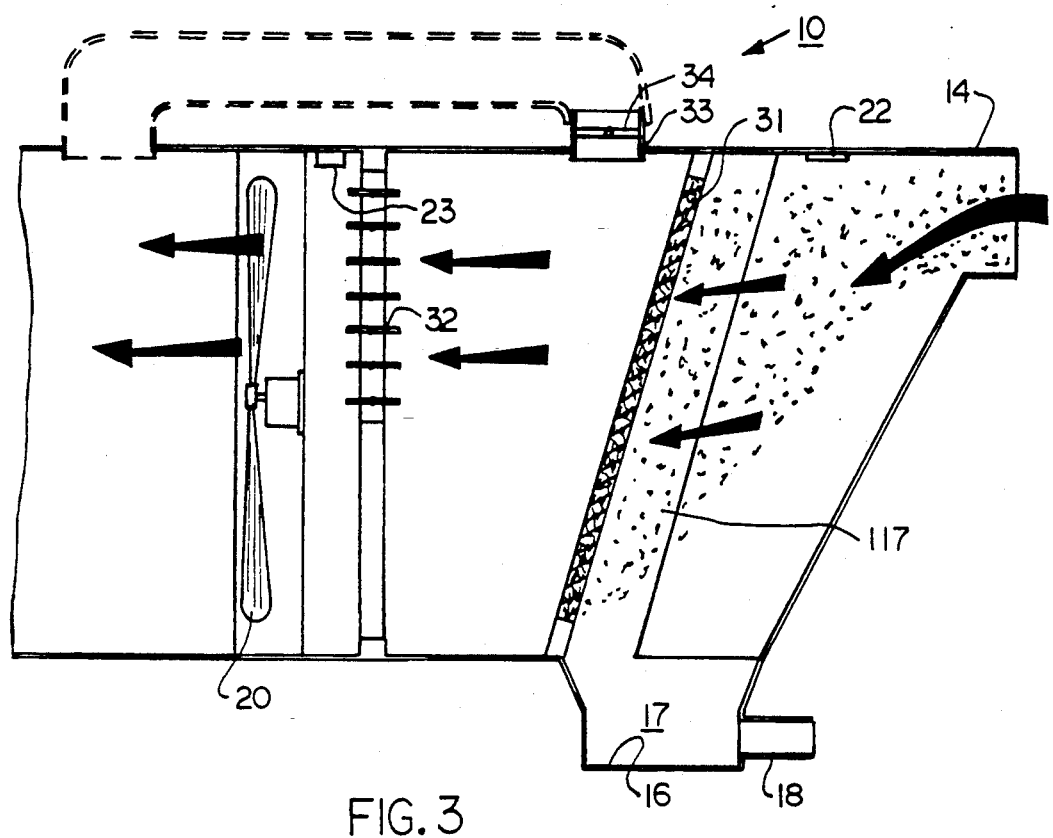
FIG. 3 is a sectional view of the apparatus through FIG. 1, taken along lines 3—3 and looking in the direction of the arrows.
Figure 4:
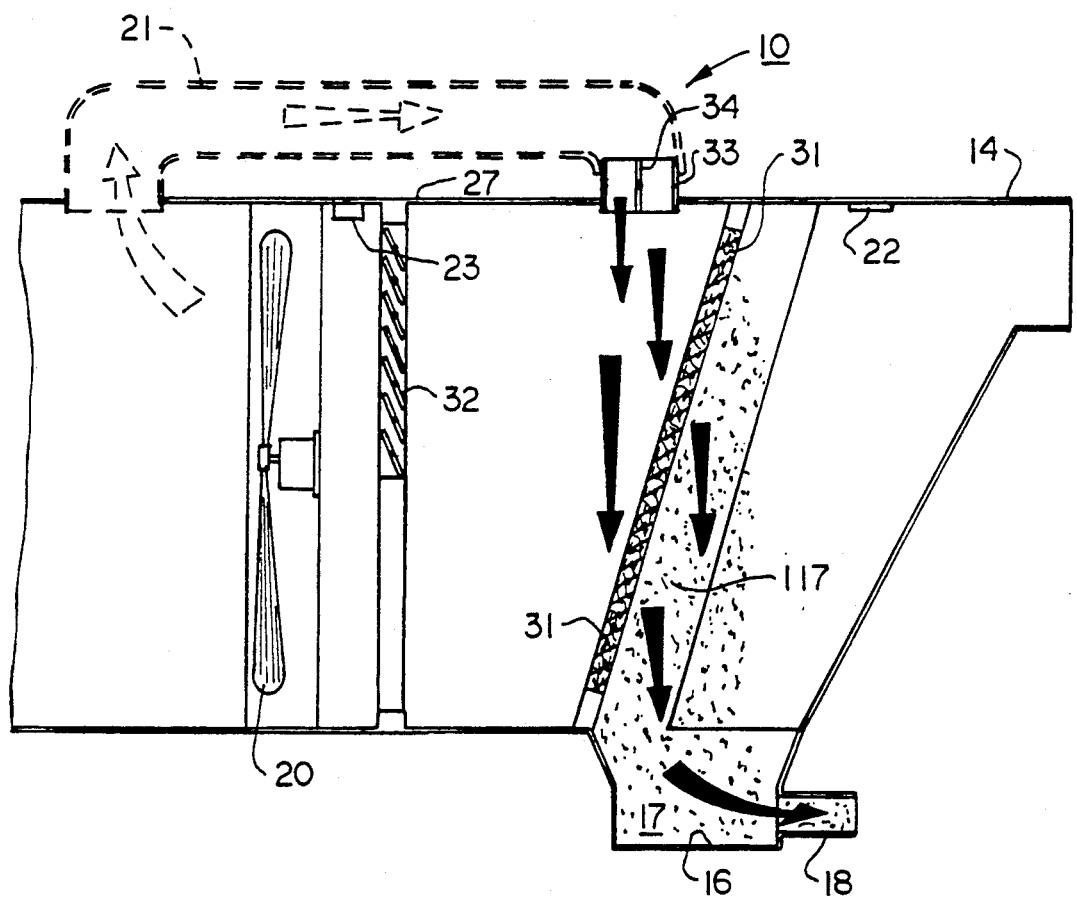
FIG. 4 is a sectional view of the apparatus of FIG. 2, taken along lines 4—4 and looking in the direction of the arrows.
Figure 5:
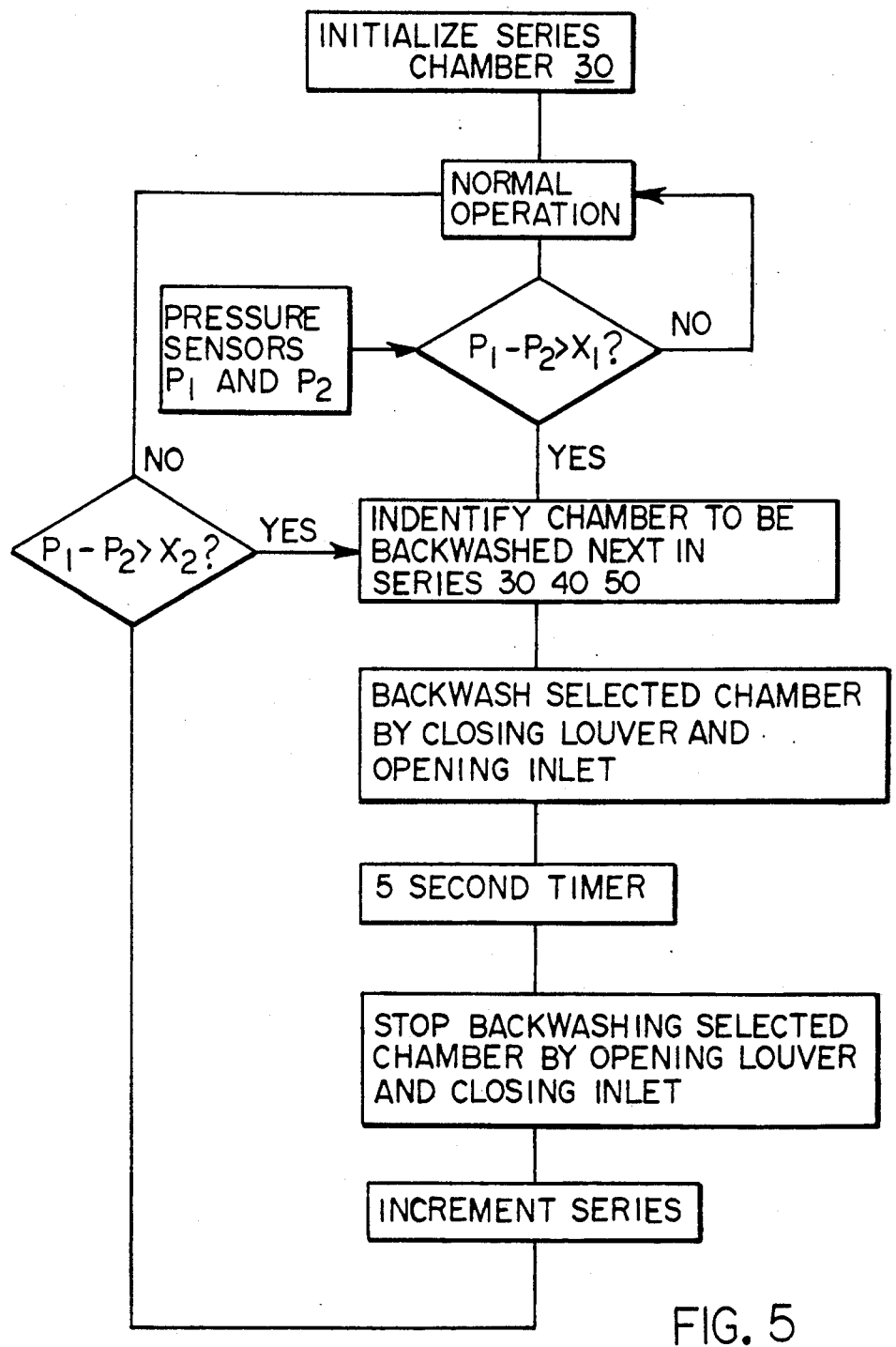
FIG. 5 is flow chart showing operation of the apparatus and the backwashing sequence.
Figure 6:
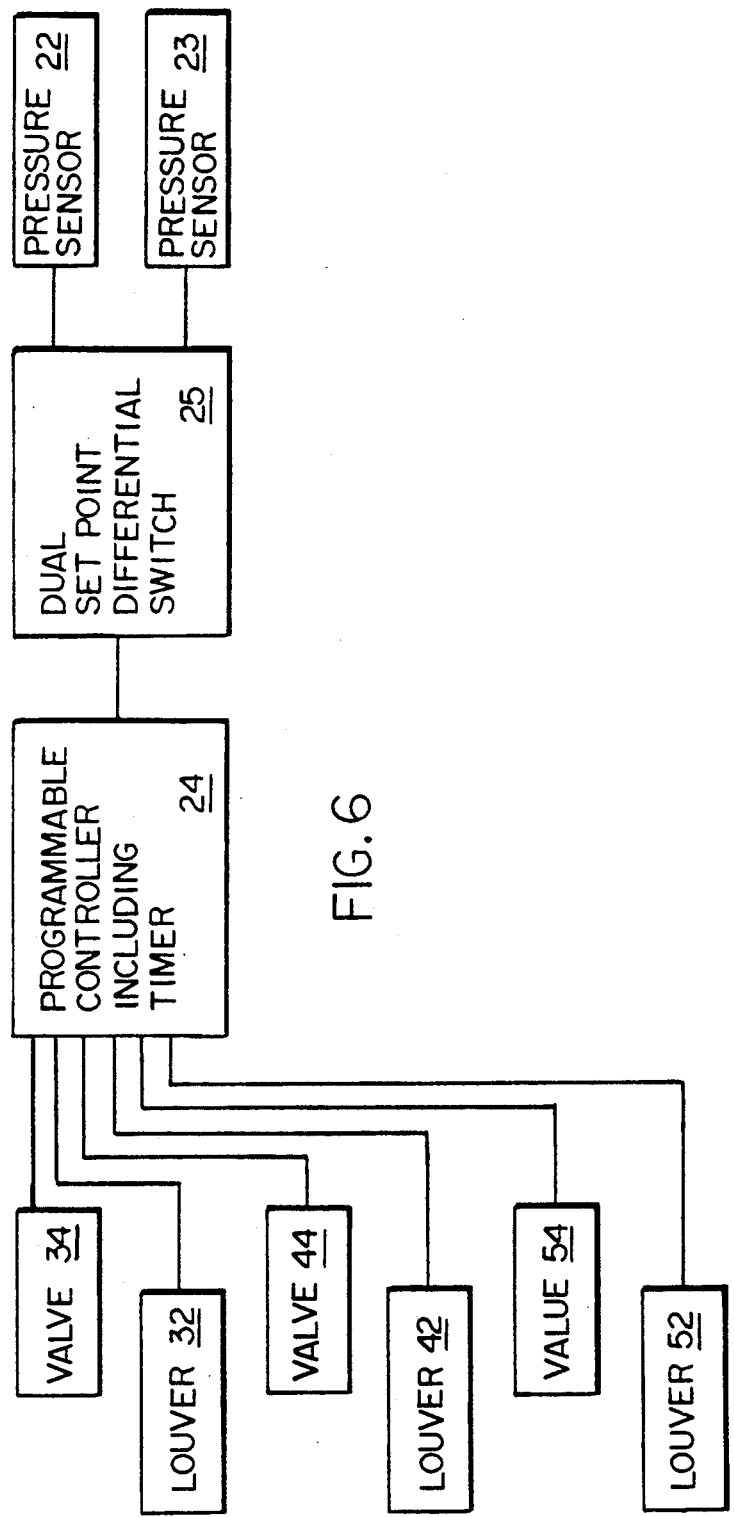
FIG. 6 is a schematic diagram of the control circuit for closing and opening the valves in response to the sensors and connection to the controller and timer thereof.

In operation, the apparatus operates as shown in FIGS. 1 and 3 with the contaminated air supply being provided to the primary plenum 14 through the air inlet 12. The open primary plenum slows down the moving air supply so solids tend to drop out into the collection zone 16. Other solids are trapped by the respective screens 31,41,51 as the air is drawn downstream through the secondary plenums 30,40,50 toward the fan 20. Since the screens slant rearwardly, the force of gravity tends to pull the solids off the screen and down to the collection zone. Nonetheless, over a period of time, an excessive amount of solids will accumulate on this screen, requiring backwashing. This condition is sensed by the increase in pressure P1 sensed by sensor 22 over the pressure P2 sensed by sensor 23 by some preset amount X1. When this condition obtains, the programmable controller 24 initiates a backwash by closing the louvers 32 secondary plenum 30 and opening its associated air inlet 34. Thus, the main flow of air from the primary plenum 14 to the secondary plenum 30 is terminated because of the closing of the louvers 32. In fact, a reverse flow of air through the open valve 34 causes the air to flow from the secondary plenum 30 to the primary plenum 14, thus blowing the collected solids on the screen 31 back into the primary plenum 14, at which time they can readily fall to the collection zone 16. Divider 17 prevents the mat of fibers dropping off of screen 31 from immediately passing to the screen 41 and thus allows the fibers to be removed through the solids retrieval apparatus 18 associated with screen 31. The air continues out through one of the screens 41,51 along with the main flow of air coming in through the air inlet 12 and out through the open louvers 42,52 so that the apparatus and airflow are as shown in FIGS. 2 and 4. After a preset period of 5 seconds, the valve 34 is closed to remove the backwash air and the louvers 32 are opened to permit the resumption of the main airflow from the primary plenum 14 through the secondary plenum 30 to the tertiary plenum 27. If the pressure difference P1-P2 continues to exceed X2, the lower value in the preset range, the programmable controller will initiate a backwashing procedure for the next screen in sequence, either 41 or 51. The sequence is conveniently stored in memory in the programmable controller, and the programmable controller controls operation of the apparatus in a flow as shown in FIG. 5.

The backwashing preferably is done with ambient air from a room in which the apparatus is situated, but as shown in phantom in the drawings, the air may be fed back from a downstream portion of the apparatus.

An additional advantage of the present invention is the provision of the screens 31,41,51 in modular form, corresponding to their respective secondary plenums 30,40,50. Thus, with smaller screens, the cost to replace a screen is less than for a larger screens, and the likelihood of damage requiring total replacement is less. Furthermore, the present invention never excessively restricts the area of the airflow, so that higher pressures are not needed to effectively move large volumes of air. For example, as shown in FIG. 1, with three sets of louvers, there is always at least two-thirds of the cross-sectional area available for airflow, so that undue restriction does not take place and excessive pressure is not required. Thus, expensive gasketing and sealing is not required and the system can operate at pressures on the order of 2 inches of water.

As can be appreciated, the number of screens and their associated secondary plenums and other devices can be increased well above the three shown in FIGS. 1 and 2 simply by adding similar elements and increasing the size of the primary plenums associated, and perhaps also the size of the fan. In fact, increasing the numbers of secondary plenums enhances the reduced pressure advantage of the present invention. For example, if there are six secondary plenums, the cross-sectional area is always at least 5/6ths of the maximum, so that excessive pressure is not required. That is, although the invention could be implemented using only two side-by-side secondary plenums in associated component, the advantage from using the invention increases as the number of secondary plenums increases, making it ideally suited for handling larger volumes of air.

Also, the invention allows a fiber mat to build up on the screens, which entraps fine particles and dust, to provide more thorough cleaning, even with relatively coarse screen meshes.

Preferably the pressure sensors 22,23 are connected to a Dwyer photohelic dual set point differential switch. Other pressure switches can be used. Also, preferably, the screens are 70-mesh screens although other screen meshes can be used. In a particularly preferred embodiment, the programmable controller is an Allen Bradley SLC100 programmable controller, although other devices could be used to achieve similar control. Also preferably, the valves 34,44,54 are 8" diameter pneumatic valves operated by solenoids. The fiber separator screen may be fully removed from the unit for maintenance by mounting them in a clamped-in fashion.

FIG. 5 illustrates in flow chart form the processing of the apparatus under the control of the programmable controller and dual set point switch.

As will be apparent, numerous variations in the specific embodiment disclosed can be carried out by those of ordinary skill and still fall within the scope of the invention. For example, variations in the sequence of backwashing steps may take place, the length of the backwash cycle can be varied considerably, as well as other variations which will be apparent to those of ordinary skill in the art.

What is claimed is:

1. A method of collecting fiber from a moving airflow having entrained fibers comprising
   a. directing the moving airflow with entrained fibers into a primary plenum having a fiber collection zone in its lower portion,
   b. simultaneously
      (1) directing a first portion of the air through a first screen downstream of the primary plenum with some of the fibers entrained in the first portion of air collecting on the first screen, the first portion of air continuing through a first secondary plenum downstream of the first screen and a first independently closable passage downstream of the first secondary plenum,
      (2) directing a second portion of the air through a second screen downstream of the primary plenum with some of the fibers entrained in the second portion of air collecting on the second screen, the second portion of air continuing through a second secondary plenum downstream of the second screen and a second independently closable passage downstream of the second secondary plenum,
      (3) directing a third portion of air through a third screen downstream of the primary planum with some of the fibers entrained in the third portion of air collecting on the third screen, the third portion of air continuing through a third secondary plenum downstream of the third screen and a third independently closable passage downstream of the third secondary plenum,
      (4) joining the first, second and third portions downstream of the independently closeable passages,
      (5) sensing the air pressure upstream of the screens,
      (6) sensing the air pressure downstream of the independently closable passages and the screens, and
   c. when the pressure difference between the first and second pressure sensors exceeds a desired value, closing the first independently closeable passage and introducing a flow of clean air to the first secondary plenum downstream of the first screen and upstream of the first passage to backwash the first screen to drop fibers blocking the first screen into the collection zone with the flow of clean air passing through the other screens, secondary plenums and independently closeable passages with the other portions of air.

2. A method as claimed in claim 1 comprising providing the first passage of an area about one half as large as the are of the first secondary plenum in a plane perpendicular to the direction of airflow through the first secondary plenum so that the passage does not substantially raise the pressure in the first secondary plenum when it is open.

3. A method as claimed in claim 1 wherein the number of portions of air being directed through secondary plenums, associated screens and passages and the number of clean air flows is greater than 2.

4. A method as claimed in claim 1 wherein the number of portions of air being directed through secondary plenums, associated screens and passages and the number of clean air flows is greater than 4.

5. A method as claimed in claim 1 wherein the upstream and downstream pressure sensing each take place at only one location.

6. A method as claimed in claim 1 wherein the clean air flow is directed from downstream of the passages so that the backwash airflow is derived from the main airflow through the fiber collector.

7. A method as claimed in claim 1 wherein the clean air flow is directed from the ambient.

8. A method as claimed in claim 1 further comprising ceasing the flow of clean air into the first secondary plenum and opening the first independently closeable passage after a preset period of time.

9. A method as claimed in claim 8 further comprising, if the pressure difference is still above a preset value, closing the second independently closeable passage and introducing a flow of clean air to the second secondary plenum downstream of the second screen and upstream of the second passage to backwash the second screen to drop fibers blocking the second screen into the collection zone with the flow of clean air passing through the first screen, first secondary plenum and first independently closeable passage with the first portion of air.

10. A method as claimed in claim 9 comprising continuing to backwash screens as long as the pressure difference exceeds a preset range.

11. A method as claimed in claim 10 comprising following a preset sequence in backwashing screens.

12. A method as claimed in claim 11 comprising halting the backwash sequence if the pressure difference after a backwash is below a lower end of the preset range, and resuming the sequence where it was left off when the pressure difference exceeds the upper end of the preset range.

13. A method of collecting fiber from a moving airflow having entrained fibers comprising
introducing the airflow with its entrained fibers into a primary plenum having a fiber collection zone in a lower portion thereof,
passing at least three portions of the air flow through three screens downstream of the primary plenum and slanted with respect to the primary plenum so that fiber held by the screens will be gravitationally attracted to the fiber collection zone,
passing the airflow portions through secondary plenums downstream of each of the screens and through independently closable passages downstream of the secondary plenums without substantially restricting the flow of the portion of air by the passage,
sensing the pressure upstream of the screens,
sensing the pressure downstream of the passages, and in response to the sensed pressures indicating an excessive difference between the upstream and downstream pressures characteristic of fiber buildup on the screens,
closing the passage for one of the secondary plenums and introducing a flow of clean air to the same secondary plenum as a backwash to cause the fibers held by the screen upstream of that secondary plenum to be dropped in to the fiber collection zone,
after a preset period of time halting the clean air flow to the secondary plenum and opening the passages,
continuing to backwash secondary plenums in a preset sequence of secondary plenums as long as the pressure difference is excessive and
halting the backwash sequence if the pressure difference after a backwash is no longer excessive, but resuming the sequence where it was left off when the pressure becomes excessive again.

14. A fiber collector for collecting fiber from a moving airflow having entrained fibers comprising
a primary plenum into which the moving airflow with entrained fibers is introduced having a fiber collection zone in a lower portion thereof,
at least three screens forming a boundary downstream of said primary plenum,
at least three secondary plenums, one each downstream of one of said screens and each having an independently openable air inlet for a reverse airflow downstream of the screen, and at least three independently closable passages, one each being downstream of one of said secondary plenums,
a first pressure sensor upstream of said screens,
a second pressure sensor downstream of said independently closable passages downstream of said screens, an airflow moving means downstream of the screens for moving the air flow, and
control means receiving pressure sense data from said pressure sensors and closing said independently closeable passage for one of said secondary plenums and opening said independently openable air inlet of the same secondary plenum when the pressure difference between said first and second pressure sensors exceeds a desired value,
whereby an airflow with entrained fibers may be introduced into said primary plenum, with the airflow passing through said screens and fiber falling into said collection zone or being held by said screens, and
when one of said screens is so full of held fibers as to inhibit air flow therethrough and thereby increase the pressure difference measured by said first and second sensors, said independently openable air inlet to said secondary plenum downstream of said full screen is openable and said independently closeable passage downstream of said full screen is closeable so that the airflow through said full screen is reversed as a backwash to cause the fibers held by said screen to be dropped in to said fiber collection zone.

15. A fiber collector as claimed in claim 14 wherein said control means is a programmable controller and a dual set point differential switch.

16. A fiber collector as claimed in claim 14 wherein said passages have an area about one half as large as the area of their associated secondary plenums in a plane perpendicular to the direction of airflow through said secondary plenum.

17. A fiber collector as claimed in claim 14 wherein said screens are slanted with respect to said primary plenum so that fiber held by said screens will be gravitationally attracted to said fiber collection zone.

18. A fiber collector as claimed in claim 14 wherein said screens are immediately adjacent one another.

19. A fiber collector as claimed in claim 14 wherein only one set of first and second pressure sensors are used to determine when to backwash.

20. A fiber collector as claimed in claim 14 wherein said air inlets receive air from downstream of said passages so that the backwash airflow is derived from the main airflow through the fiber collector, without the need of additional fans or blowers.

21. A fiber collector as claimed in claim 14 further comprising a fan downstream of said passages to pull air through said primary plenum, screens, secondary plenums and passages and having an outlet communicating with said air inlets to provide air to said secondary plenums when their respective air inlets are open.

22. A fiber collector as claimed in claim 14 wherein said air inlets receive air from the ambient, without the need of additional fans or blowers.

23. A fiber collector as claimed in claim 14 further comprising a fan downstream of said passages to pull air through said primary plenum, screens, secondary plenums, inlets and passages.

24. A fiber collector as claimed in claim 14 wherein said screens are coplanar and adjacent one another to from a screen junction and baffles extend forwardly from said junction into said primary plenum.

25. A fiber collector as claimed in claim 14 wherein dividers are provided in the collection zone generally parallel with the airflow.

26. A fiber collector as claimed in claim 14 wherein said control means closes said independently openable air inlet and opens said independently closeable passage a preset period of time after closing said independently openable air inlet and closing said independently closeable passage.

27. A fiber collector as claimed in claim 26 wherein said control means backwashes another secondary plenum after said first secondary plenum if the pressure difference is still above a preset difference.

28. A fiber collector as claimed in claim 27 wherein said control means continues to backwash secondary plenums as long as the pressure difference exceeds the preset difference.

29. A fiber collector as claimed in claim 28 wherein said control means follows a preset sequence in backwashing secondary plenums.

30. A fiber collector as claimed in claim 29 wherein said control means halts the backwash sequence if the pressure difference after a backwash is below the preset difference, but resumes the sequence where it left off when the pressure drops below the preset difference.

31. A fiber collector for collecting fiber from a moving airflow having entrained fibers comprising
- a primary plenum into which the moving airflow with entrained fibers is introduced having a fiber collection zone in a lower portion thereof,
- at least three screens downstream of said primary plenum and adjacent one another and slanted with respect to said primary plenum so that fiber held by said screens will be gravitationally attracted to said fiber collection zone,
- a secondary plenum downstream of each of said screens and each having an independently openable air inlet, and
- an independently closable set of louvers downstream of each of said secondary plenums, each set of louvers having of area about one half as large as the area of its secondary plenum in a plan perpendicular to the direction of airflow through said secondary plenum,
- a fan downstream of said louvers to pull air through said primary plenum, screens, secondary plenums and sets of louvers,
- a first pressure sensor upstream of said screens,
- a second pressure sensor downstream of said independently closable set of louvers, and
- control means receiving pressure sense data from said pressure sensors and closing said set of louvers for one of said secondary plenums and opening said independently openable air inlet of the same secondary plenum when the pressure difference between said first and second pressure sensors exceeds a desired range,
- whereby an airflow with entrained fibers may be introduced into said primary plenum, with the airflow passing through said screens and fiber falling into said collection zone or being held by said screens, and
- when one of said screens is so full of held fibers as to inhibit air flow therethrough and thereby increase the pressure difference measured by said first and second sensors, said independently openable air inlet to said secondary plenum downstream of said full screen is openable and said independently closeable set of louvers downstream of said full screen is closeable so that the airflow through said full screen is reversed as a backwash to cause the fibers held by said screen to be dropped in to said fiber collection zone, and
- wherein said control means closes said independently openable air inlet and opens said set of louvers after a preset period of time and continues to backwash secondary plenums in a preset sequence of secondary plenums as long as the pressure difference exceeds the preset range and halts the backwash sequence if the pressure difference after a backwash is below the preset range, but resumes the sequence where it left off when the pressure drops below the preset range.

* * * * *